United States Patent

Pilloff et al.

[11] 3,760,293
[45] Sept. 18, 1973

[54] CONTINUOUS WAVE, FREE-BURNING FLAME LASER

[75] Inventors: Herschel S. Pilloff, Oxon Hill; Stuart K. Searles, Temple Hills, both of Md.; Nicholas I. Djeu, Washington, D.C.

[73] Assignee: The United States of America as represented by the Secretary of the Navy, Washington, D.C.

[22] Filed: Feb. 24, 1972

[21] Appl. No.: 229,142

[52] U.S. Cl. ............................... 331/94.5, 330/4.3
[51] Int. Cl. ........................... H01s 3/22, H01s 3/09
[58] Field of Search .................... 331/94.5; 330/4.3

[56] References Cited
UNITED STATES PATENTS
3,510,797   5/1970   Nieuwpoort et al. ............... 331/94.5

OTHER PUBLICATIONS

Bleekroode et al., Applied Optics Suppl. No. 2: Chemical Lasers, 1965, pp. 179–180.

Foster et al., J. Chem. Phys., Vol. 53, 1970, pp. 2539–2540.

Primary Examiner—Ronald L. Wibert
Assistant Examiner—R. J. Webster
Attorney—R. S. Sciascia et al.

[57] ABSTRACT

This disclosure is directed to a self-sustaining infrared continuous wave laser in which laser oscillation is achieved from a free-burning flame in a vacuum. Laser action is maintained as long as the chemical agents are supplied and burned. $CS_2$ and $O_2$ are injected from alternate tubes and burned together to form CO with a population inversion between vibration-rotation levels. The optical cavity is formed by spaced dielectrically coated mirrors each having a reflectivity of approximately 99.2 percent. One of the mirrors has a centrally located hole, for output coupling. The flame is ignited by a glow discharge several inches above the burner. The discharge is turned off once the flame is started. The system will produce laser oscillations as long as the supply of chemicals are maintained.

4 Claims, 2 Drawing Figures

CONTINUOUS WAVE, FREE-BURNING FLAME LASER

BACKGROUND OF THE INVENTION

This invention relates to chemical lasers and more particular to a continuous wave low pressure free burning flame laser.

Heretofore, solid state, gaseous and chemical reaction lasers have been developed to provide a coherent light source. Prior chemical lasers have required repetitive or continuous excitation such as by flash lamps, or electrical discharges, or special gas flow techniques such as supersonic expansion or sequential mixing of chemical reagents to bring about laser action. A status report on chemical lasers has been previously reported in "Chemical Lasers: A Status Report" by Arthur N. Chester; LASER FOCUS November 1971, pp 25–30. U.S. Pat. No. 3,510,797 sets forth a flame laser using acetylene and oxygen.

SUMMARY OF THE INVENTION

This invention provides a system by which stimulated emission of radiation is produced by a self sustaining flame to provide a self sustaining continuous wave flame laser. The self sustaining system involves branching chain reactions — reactions in which one reactive intermediate produces two or more reactive intermediates in the products. The branching chain reactions maintain a steady-state concentration of reactive intermediates by replacing those lost by diffusion out of the flame and by so-called termination reactions occurring within the flame itself. The rates of these branching chain reactions relative to the other reactions in the system determine to a large extent the success or failure of a particular system (previously non-self sustaining chemical laser) as a flame laser. For a flame laser, it is generally desirable that the branching chain reactions be as fast as possible and have minimum activation energies consistent with the fact if the reactions are too fast, an explosion may result.

STATEMENT OF THE OBJECTS

It is therefore an object of the present invention to produce stimulated emission of radiation by a self sustaining flame.

Another object is to provide a chemical laser in which the reaction is sustained by chemical processes without requiring external electrical, heat or flashlamp input.

Still another object is to provide a chemical laser which is totally self sustaining and does not use special gas-flow techniques.

Other objects and advantages of the invention will become obvious from the following more complete description thereof when considered with the accompanying drawing.

Figure 1:
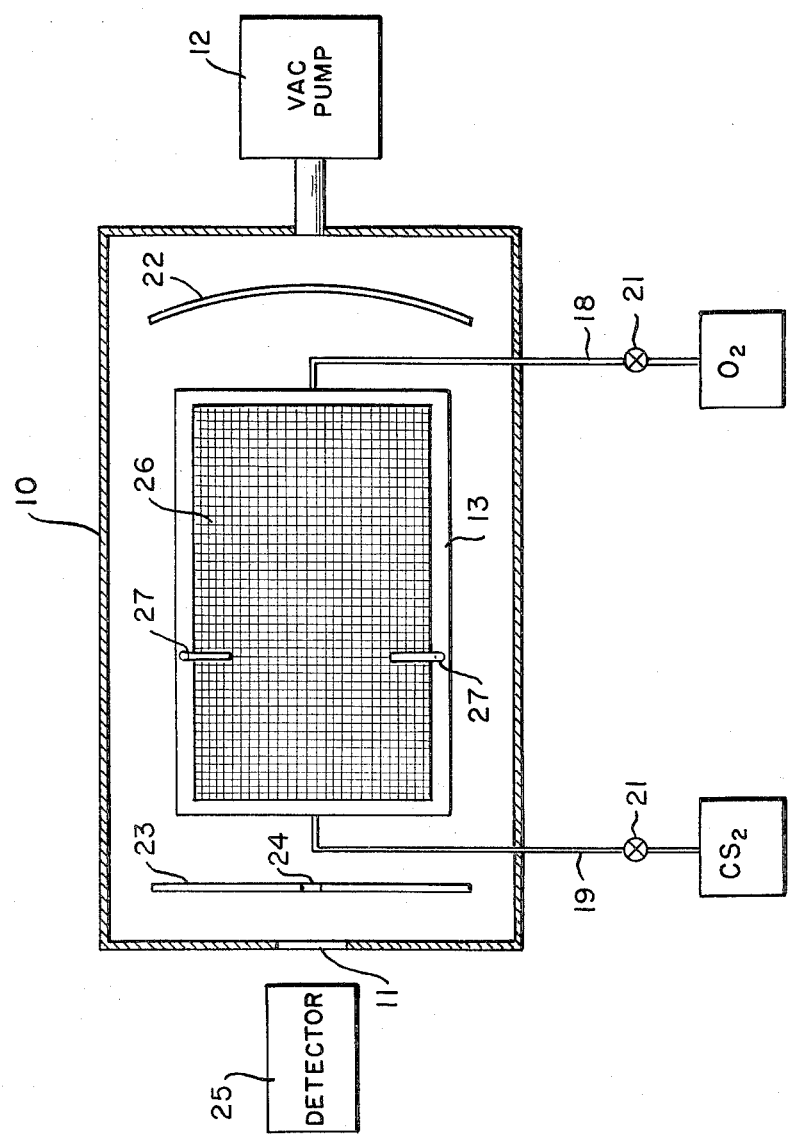
FIG. 1 illustrates a schematic diagram of the chemical laser system.
Figure 2:
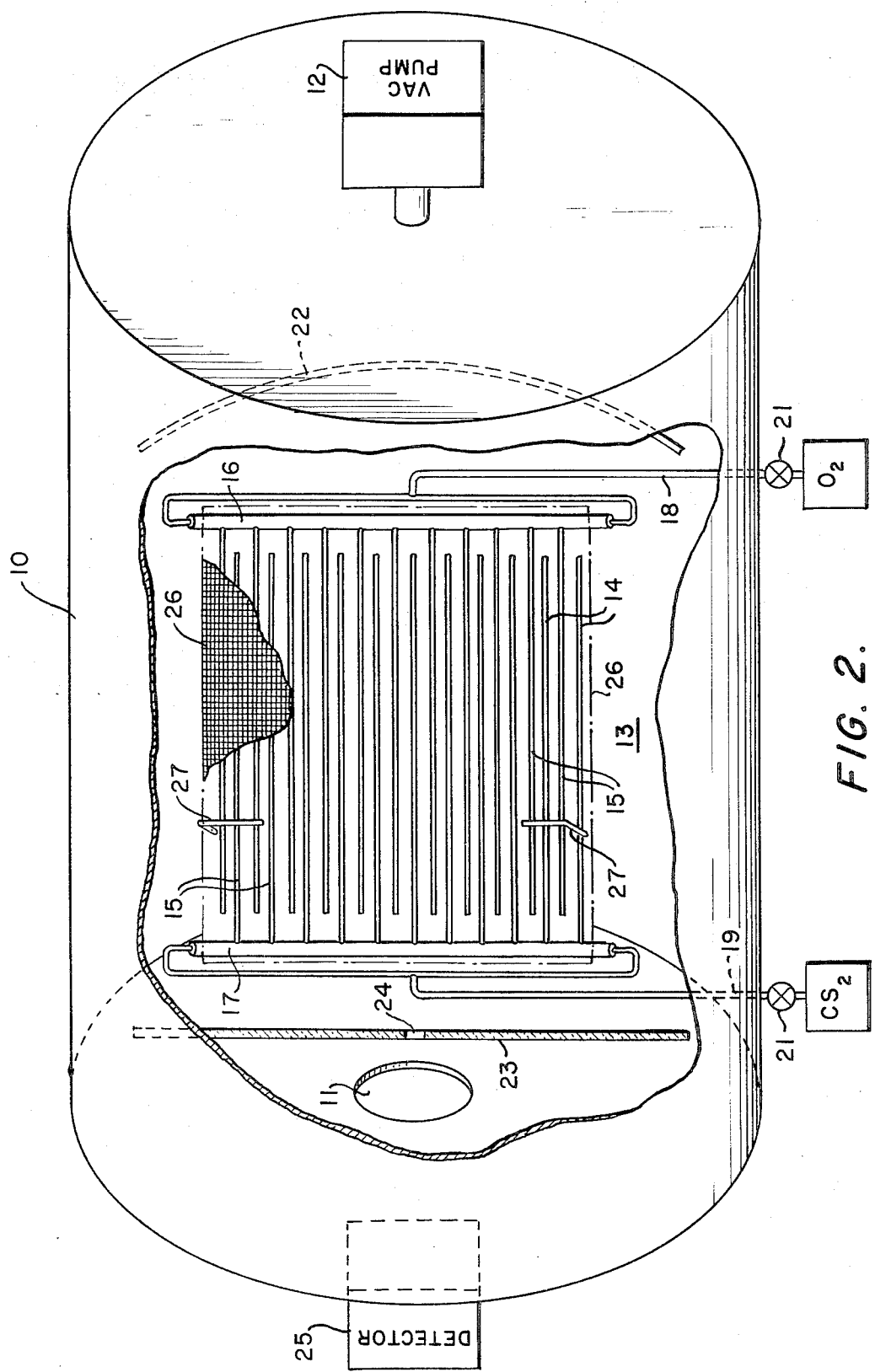
FIG. 2 illustrates the relative parts of the device.

Now referring to the drawings there is shown by illustration a chemical laser system made in accordance with the teaching of the present invention. As shown, the system includes a 4 foot diameter by 9 foot long vacuum chamber 10 including therein a suitable optical window 11 through which light may pass to the outside of the chamber. Any suitable vacuum pump means 12 capable of pumping 300 cubic feet per minute is provided to evacuate the chamber. A burner 13 comprising a horizontal planar array formed by two sets of tubes 14 and 15 each closed at one end, are alternately arranged and connected to a manifold 16, 17 at the open end through which a suitable gas is admitted through feed lines 18 and 19 under a suitable pressure. As shown, oxygen, $O_2$, is admitted through manifold 16 and carbon disulfide, $CS_2$, is admitted through the opposite manifold 17. The gases are controlled by suitable valves 21. A low-loss optical resonator or cavity is formed by two dielectrically coated fully reflective mirrors 22 and 23 mounted with the axis thereof parallel with the burner and thus transverse to the direction of flame propagation. Mirror 22 is concave whereas mirror 23 is planar and includes therein a centrally located hole 24 for output coupling. A detector 25 is sown opposite window 11 for detecting the laser output. A fine mesh screen 26 is placed over the top of the tubes to aid in mixing of the gases during burning.

For illustrative purposes each burner tube is 60 cm long with a 6 mm outside diameter each made with 50 evenly spaced 1 mm holes aligned along the top. The sets of alternate tubes feed $O_2$ through one set and $CS_2$ through the other set. The mirrors are sufficiently large to reflect any light produced across the width of the burner and the burner is mounted for movement vertically such that the burner produced flame may be positioned in the most favorable position relative to the mirrors that form the resonant cavity.

Ignition of the gases may be brought about by a glow discharge by use of electrodes 27 positioned above and to the sides of the burner. Once the gases have been ignited the electrodes are inactivated and are no longer needed until initiation of another flame since the flame, once ignited, remains totally self sustaining as long as the supply of gaseous reagents is maintained.

In operation, the vacuum chamber is evacuated to less than 1 Torr. The gases are admitted through the burner with the oxygen pressure, $P_o$, at 9 Torr and the carbon disulfide, $P_{CS_2}$, at 0.6 Torr. The flame is ignited by a glow discharge produced between the electrodes. As soon as the flame has ignited, the glow discharge is no longer needed and is inactivated. The burning gases produce carbon monoxide from which stimulated emission is obtained. The detailed chemistry of the flame is complex and not fully understood, however, it is believed that one possible set of branching chain reactions for the low pressure $CS_2 - O_2$ flames is as follows:

$CS_2 + O \xrightarrow{(1)} CS + SO$, 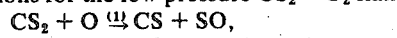
$k_1 = 1.2 \times 10^{13} e^{-1050/RT} cm^3/mole\ sec$
$SO + O_2 \xrightarrow{(2)} SO_2 + O$, 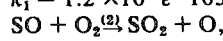
$k_2 = 3.5 \times 10^{11} e^{-6500/RT} cm^3/mole\ sec$
$CS + O \xrightarrow{(3)} CO + S$, 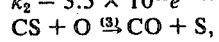
$k_3 \approx 10^{14}\ cm^3/mole\ sec$
$S + O_2 \xrightarrow{(4)} SO + O$, 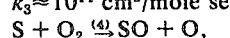
$k_4 = 1.0 \times 10^{13} e^{-5600/RT} cm^3/mole\ sec$ These reactions indicate only one possible branching mechanism; no chain terminating steps including the reaction $SO + O \rightarrow SO_2 + h\nu$ responsible for a bluish-white emission observed from these flames have been shown here. Unlike the electrical-discharge $CS_2 - O_2$ chemical laser which requires only reactions (1) and (3), the flame laser requires all four reactions. Because reactions (2) and (4) have moderately high activation energies and are relatively slow, a moderate flame temperature is necessary in order that these reactions may proceed at a reasonable rate.

The reaction in the flame is between the mirrors such that the appropriate radiation is reflected back and forth between the mirrors. The laser radiation output emerges through the hole in the planar mirror and passes through the optical window in the vacuum chamber to the outside as coherent radiation.

It has been determined that the characteristics of the $CS_2$–$O_2$ flame depend on the pressure ratio, $P_{cs_2}/P_{o_2}$, and on the total pressure, $P_T$. Under conditions appropriate to the described burner, at pressure below ~2 Torr, the flame, as characterized by its blue emission, is diffuse and homogeneous. Starting with an intitial ratio $P_{cs_2}/P_{o_2} \approx 0.5$, as $P_{o_2}$ is increased with $P_{cs_2}$ held constant, the flame breaks up into several hundred small domelike flames uniformly distributed over the top of the burner. Unless the edges of this flame is lifted by further increasing $P_{o_2}$, no gain is observed in the flame. Under the conditions $P_{o_2} \approx 9$ Torr and $P_{cs_2} \approx 0.6$ Torr, the flame appears nonuniform with some spatial instabilities. A small change in $P_{cs_2}$ ($\Delta P_{cs_2} \approx \pm 0.1$ Torr) terminates lasting.

A 0.25-m Ebert monochromator was used to analyze the laser output. cw laser oscillation was observed on three CO vibration-rotation transitions at 5.216–$\mu$2 (8–7)P(11), 5.297–$\mu$2 (9–8)P(12), and 5.421–$\mu$2 (11–10)P(10). Total laser output power was measured with a thermopile to be about 1 mW.

It has been determined that by selective addition of certain gases (vibrationally unexcited) to the $CS_2$–$O_2$, it is possible to substantially enhance the output power. These additive gases appear to increase the population inversion by functioning as specific-heat sinks for depopulating certain (lower) vibrational levels in CO. Carbonyl sulfide, OCS, has been determined to be an effective additive at low concentrations. When 0.1 Torr OCS was added to the $CS_2$–$O_2$ flame laser, an approximately twofold power increase was observed.

Obviously many modification and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A system for producing stimulated light emission by means of a totally self sustaining flame which comprises,
a closed chamber,
means connected with said chamber for evacuating said chamber,
a burner within said chamber,
said burner including a plurality of linear side-by-side tubes in a horizontal planar array,
each of said tubes closed at one end and open at one end and including equally spaced gas outlet apertures along the length of the top thereof,
means for introducing at least two different gases, a different gas independently into the open ends of alternate tubes at given pressures,
means within said chamber for igniting said gases to produce a flame for producing chemical reaction of said gases and for producing a population inversion between energy levels of the gaseous reaction products of said reaction, and
an optical resonator positioned relative to said burner with the optical axis thereof above and parallel with said burner for stimulating the emission of radiation from vibration-rotation transitions between said population inverted levels.

2. A system as claimed in claim 1; wherein,
said gases fed independently into said chamber through said burner are oxygen and carbon disulfide.

3. A system as claimed in claim 2; which includes,
a screen secured over said burner through which said gases flow for producing said flame.

4. A system as claimed in claim 3; in which,
said burner includes two sets of tubes each set comprising a plurality of separate tubes connected at one end to a separate manifold and closed at the opposite ends,
each of said tubes including spaced, linearly, aligned holes in the top side thereof through which the gases are admitted into said chamber, and
said oxygen is admitted to one set of tubes through one manifold and carbon disulfide is admitted to the other set of tubes through another manifold.

* * * * *